US012572947B2

(12) United States Patent     (10) Patent No.:   US 12,572,947 B2

Thiemann et al.        (45) Date of Patent:     Mar. 10, 2026

(54) ARTIFICIAL INTELLIGENCE MODELING FOR ASSESSING FUTURE RECURRING TRANSACTIONS

(71) Applicant: Stripe, Inc., South San Francisco, CA (US)

(72) Inventors: Alexander Thiemann, South San Francisco, CA (US); Ji Huang, South San Francisco, CA (US); Arne Roomann-Kurrik, South San Francisco, CA (US)

(73) Assignee: Stripe, Inc., South San Francisco, CA (US)

( * ) Notice: Subject to any disclaimer, the term of this patent is extended or adjusted under 35 U.S.C. 154(b) by 75 days.

(21) Appl. No.: 18/520,460

(22) Filed: Nov. 27, 2023

(65) Prior Publication Data

US 2025/0173730 A1     May 29, 2025

(51) Int. Cl.
    *G06Q 20/42*       (2012.01)
    *G06N 20/00*       (2019.01)
           (Continued)

(52) U.S. Cl.
    CPC .............. *G06Q 20/42* (2013.01); *G06N 20/00* (2019.01); *G06Q 20/02* (2013.01); *G06Q 20/108* (2013.01);
           (Continued)

(58) Field of Classification Search
    CPC ..... G06Q 20/42; G06Q 20/00; G06Q 20/4037
    See application file for complete search history.

(56) References Cited

U.S. PATENT DOCUMENTS 11,507,953 B1 * 11/2022 Cohn ...................... G06N 20/00
11,775,977 B1 * 10/2023 Kruse ................ G06Q 20/4016
                                     705/40

(Continued)

FOREIGN PATENT DOCUMENTS

EP           3407281 A1 * 11/2018 ........... G06Q 20/401
WO    WO-2024064325 A1 * 3/2024 ........... G06Q 20/405

OTHER PUBLICATIONS

"Streamlining and Reimagining Prior Authorization Under Value-Based Contracts", Jul. 20, 2020. Available at: https://www.ahajournals.org/doi/10.1161/CIRCOUTCOMES.120.006564 (Year: 2020).*

(Continued)

*Primary Examiner* — Gregory Harper

(74) *Attorney, Agent, or Firm* — Foley & Lardner LLP

(57) ABSTRACT

Disclosed herein are methods and systems for using machine learning to improve the likelihood of success of recurring transactions. In one example, a suite of different machine learning models can be used together, such that a first machine learning model predicts a likelihood of success for a recurring transaction associated with a user account and the second machine learning model predicts whether a pre-authorization would help with the predicted likelihood of success. As a result, a server may pre-authorize the recurring transactions at a time earlier than the scheduled transaction time and place a hold on the user account using an amount predicted by the second machine learning model where the hold amount can be adjusted in accordance with the user account's activities. Data associated with the recurring transaction itself can be ingested by the second machine learning model for re-calibration purposes.

17 Claims, 5 Drawing Sheets

(51) Int. Cl.

| | | |
|---|---|---|
| *G06Q 20/02* | (2012.01) | |
| *G06Q 20/10* | (2012.01) | |
| *G06Q 20/40* | (2012.01) | |
| *G06Q 40/02* | (2023.01) | |

(52) U.S. Cl.

CPC ......... *G06Q 20/4037* (2013.01); *G06Q 40/02*
(2013.01)

(56) References Cited

U.S. PATENT DOCUMENTS

| | | | | |
|---|---|---|---|---|
| 11,823,201 B2 * | 11/2023 | Wintle | ................. | G06Q 20/405 |
| 11,861,693 B2 * | 1/2024 | Goldfield | ............ | G06Q 20/389 |
| 11,900,387 B2 * | 2/2024 | Braun | ................. | G06Q 20/405 |
| 12,045,833 B2 * | 7/2024 | Lee | ..................... | G06F 11/3006 |
| 12,045,847 B2 * | 7/2024 | Kwok | ............... | G06Q 30/0201 |
| 12,131,316 B2 * | 10/2024 | Magarkar | .............. | G06Q 20/12 |
| 12,254,454 B2 * | 3/2025 | Virbitsky | ............. | G06Q 20/102 |
| 12,265,966 B2 * | 4/2025 | Menon | ................... | G06Q 20/38 |
| 2018/0341950 A1 * | 11/2018 | Atkins | ................. | G06Q 20/322 |
| 2020/0090261 A1 * | 3/2020 | Tumulty, II | ........... | G06Q 20/42 |
| 2020/0327552 A1 * | 10/2020 | Seshan | ................. | G06Q 20/425 |
| 2021/0035209 A1 * | 2/2021 | Peak | ...................... | G06Q 40/03 |
| 2021/0103979 A1 * | 4/2021 | Mathew | ................. | G06N 20/00 |
| 2022/0051270 A1 * | 2/2022 | Benkreira | .............. | G06F 40/40 |
| 2022/0122076 A1 * | 4/2022 | Braun | ................... | G06Q 40/02 |
| 2022/0245641 A1 * | 8/2022 | Wintle | ................. | G06Q 20/102 |
| 2022/0284459 A1 * | 9/2022 | Kwok | ............... | G06Q 30/0206 |
| 2022/0335429 A1 * | 10/2022 | Dhama | ............. | G06Q 20/4016 |
| 2022/0398673 A1 * | 12/2022 | Dande | ................. | G06Q 40/125 |
| 2022/0405753 A1 * | 12/2022 | Lee | ...................... | G06Q 20/401 |
| 2023/0029024 A1 * | 1/2023 | Menon | .................. | G06Q 20/40 |
| 2023/0031874 A1 * | 2/2023 | Goldfield | ............ | G06Q 20/405 |
| 2023/0047509 A1 * | 2/2023 | Dhodapkar | ............ | G06Q 20/24 |
| 2023/0109607 A1 * | 4/2023 | Lee | ..................... | G06F 11/1474 |
| | | | | 707/703 |
| 2023/0289753 A1 * | 9/2023 | Ham | ...................... | G06Q 20/20 |
| 2023/0333959 A1 * | 10/2023 | Edwards | ............... | G06N 20/00 |
| 2024/0013293 A1 * | 1/2024 | Baguley | .............. | G06Q 20/407 |
| 2024/0037560 A1 * | 2/2024 | Kruse | ................. | G06Q 20/027 |
| 2024/0119459 A1 * | 4/2024 | Debnath | ............. | G06Q 20/405 |
| 2024/0144211 A1 * | 5/2024 | Virbitsky | .............. | G06N 20/00 |
| 2024/0161093 A1 * | 5/2024 | Magarkar | ............ | G06Q 20/401 |
| 2024/0161110 A1 * | 5/2024 | Borysek | .............. | G06Q 20/085 |
| 2024/0211906 A1 * | 6/2024 | Fenichel | ............. | G06Q 20/407 |
| 2024/0320644 A1 * | 9/2024 | Srihari | .............. | G06Q 30/0215 |
| 2025/0021977 A1 * | 1/2025 | Malhotra | ............ | G06Q 20/389 |

OTHER PUBLICATIONS

"Credit Card Authorization Hold—How and When to Use", Dec. 26, 2021. Available at: https://www.chargebackgurus.com/blog/credit-card-authorization-holds (Year: 2021).*

* cited by examiner

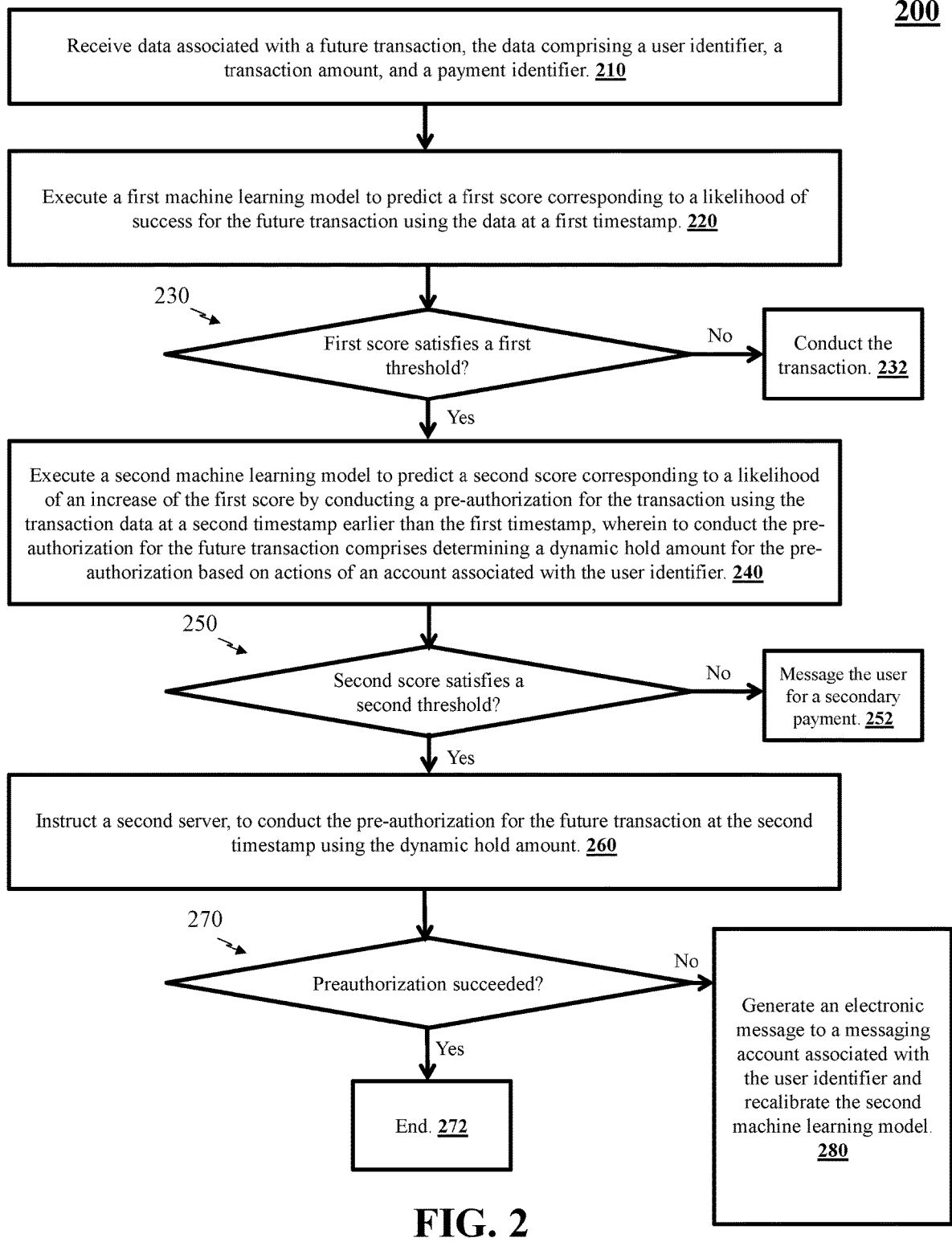

200

Receive data associated with a future transaction, the data comprising a user identifier, a transaction amount, and a payment identifier. 210

Execute a first machine learning model to predict a first score corresponding to a likelihood of success for the future transaction using the data at a first timestamp. 220

230

First score satisfies a first threshold?

No → Conduct the transaction. 232

Yes

Execute a second machine learning model to predict a second score corresponding to a likelihood of an increase of the first score by conducting a pre-authorization for the transaction using the transaction data at a second timestamp earlier than the first timestamp, wherein to conduct the pre-authorization for the future transaction comprises determining a dynamic hold amount for the pre-authorization based on actions of an account associated with the user identifier. 240

250

Second score satisfies a second threshold?

No → Message the user for a secondary payment. 252

Yes

Instruct a second server, to conduct the pre-authorization for the future transaction at the second timestamp using the dynamic hold amount. 260

270

Preauthorization succeeded?

No → Generate an electronic message to a messaging account associated with the user identifier and recalibrate the second machine learning model. 280

Yes

End. 272

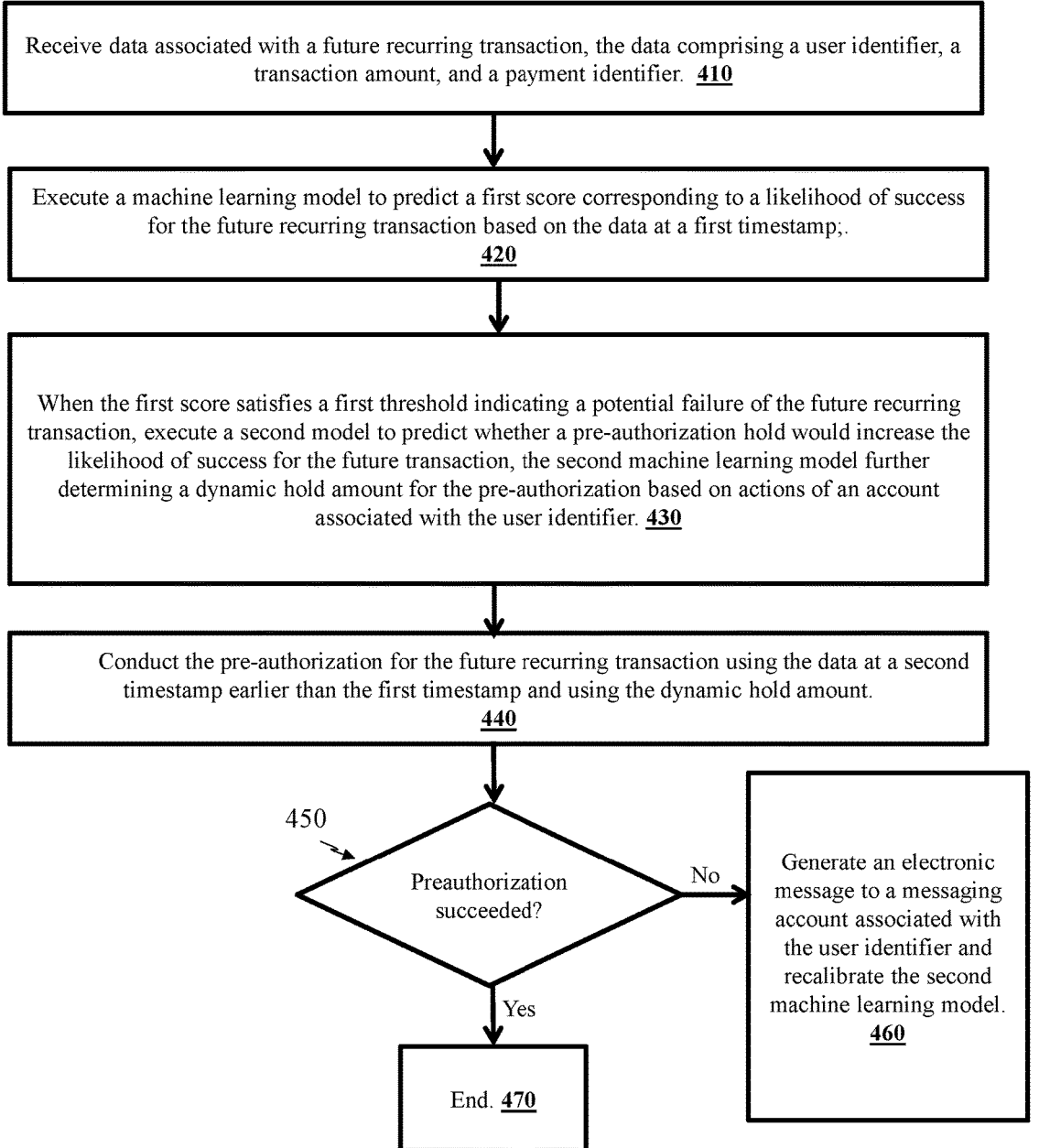

Receive data associated with a future recurring transaction, the data comprising a user identifier, a transaction amount, and a payment identifier. 410

Execute a machine learning model to predict a first score corresponding to a likelihood of success for the future recurring transaction based on the data at a first timestamp;. 420

When the first score satisfies a first threshold indicating a potential failure of the future recurring transaction, execute a second model to predict whether a pre-authorization hold would increase the likelihood of success for the future transaction, the second machine learning model further determining a dynamic hold amount for the pre-authorization based on actions of an account associated with the user identifier. 430

Conduct the pre-authorization for the future recurring transaction using the data at a second timestamp earlier than the first timestamp and using the dynamic hold amount. 440

450

Preauthorization succeeded?

No

Yes

Generate an electronic message to a messaging account associated with the user identifier and recalibrate the second machine learning model. 460

End. 470

FIG. 4

ARTIFICIAL INTELLIGENCE MODELING FOR ASSESSING FUTURE RECURRING TRANSACTIONS

TECHNICAL FIELD

This application relates generally to generating, training, and operating computer models to determine actions to perform for a future recurring transaction.

BACKGROUND

Subscription services are ubiquitous and can provide a variety of products and services at regular intervals to those subscribed. Subscription services can perform a transaction with a subscribed user through an account associated with the subscription service at regular intervals for a variety of products and services. In some cases, the subscribed user may not have adequate funds to provide for the subscription service, such as the subscribed user associating an account with a credit card already at a credit limit or a bank account with insufficient funds.

By attempting to charge an account that does not have adequate funds, the subscription service can encounter errors such as over-drafting a banking account, rejection of a charge, or being marked as fraudulent by a banking or credit company. Furthermore, subscribed users may forget an upcoming scheduled payment and may not allocate the funds to pay for the subscribed service. Efforts to perform mitigating actions, such as providing notifications to present to the subscribed user or placing holds on the account, can fail and have unquantifiable success rates. These mitigating efforts, therefore, are unlikely to improve the likelihood of a transaction succeeding due to the lack of quantifiable metrics. Therefore, conventional subscription systems encounter failed payments and undue computational processing based on the user having an insufficient amount of funds to provide to the subscription service through the account linked with the service.

In addition to creating user dissatisfaction, failed transactions can significantly overburden the electronic payment system attempting the transactions. For instance, failed transactions may force one or more servers of the electronic payment system to continuously re-attempt the transaction, which is undesirable. Moreover, failed transactions often trigger a series of additional processes that must be performed, such as a series of corrective and logging actions. Failed transactions can also signal a system failure. Accordingly, a series of internal checking mechanisms may be initiated. All of these remedial and/or corrective actions inappropriately divert computing resources from other actions necessary to be performed during the routine course of operation for the electronic payment. These actions can be computationally intensive and can consume considerable system resources, particularly if failures occur in large volumes.

SUMMARY

For the aforementioned reasons, there is a desire for methods and systems to provide analysis of pertinent characteristics of a future recurring transaction in order to identify a likelihood that the transaction will succeed and to perform mitigating actions responsive to a determination that the transaction will not succeed. What is also desired are methods and systems to determine a likelihood that performing the mitigating actions will increase the likelihood of the success of a transaction, such as a processor (or a computer model) that can receive data (e.g., data associated with a future recurring transaction), execute one or more suitable computer models, instruct a second server to conduct a preauthorization, and generate a message related to the pre-authorization. For the aforementioned reasons, there is a need to reduce the number of failed transactions in order to allocate computing resources to other actions needed to be performed.

Disclosed herein are methods and systems for a subscription service transaction system/method that uses various methods and systems, such as algorithmic methods and machine-learning models, to determine a score corresponding to a likelihood of success for a future recurring transaction. A first machine-learning model can determine a score corresponding to a likelihood that a future recurring transaction will succeed based on data associated with the future recurring transaction, including user information, payment information, and a transaction amount. Additionally, the first machine-learning model can determine the score at a timestamp of the data. A second machine learning model can determine a second score if the first score indicates that the future recurring transaction is unlikely to succeed. The second machine learning model can determine the second score, indicating the likelihood that conducting a pre-authorization for the future recurring transaction will improve the first score.

The first and second machine learning models described herein can determine the likelihood of a future recurring transaction succeeding and whether to take a mitigating action (e.g., a pre-authorization or hold for the future recurring transaction) to increase the likelihood of the transaction succeeding. These preemptive systems/methods can reduce wasted computational resources on failed transactions. Furthermore, the models described herein can adapt to learned behavior, such as retraining the second model based on data including transaction success after implementing a pre-authorization of the transaction.

Though some aspects of the embodiments discussed herein are described as applying to recurring (e.g., subscription) transactions, the methods and systems discussed herein can apply to all future transactions.

In an embodiment, a method comprises receiving, by a server, data associated with a future recurring transaction, the data comprising a user identifier, a transaction amount, and a payment identifier; executing, by the server, a machine learning model to predict a first score corresponding to a likelihood of success for the future recurring transaction based on the data at a first timestamp; when the first score satisfies a first threshold indicating a potential failure of the future recurring transaction, executing, by the server, a second machine learning model to predict whether a pre-authorization would increase the likelihood of success for the future recurring transaction, the second machine learning model further determining a dynamic hold amount for the pre-authorization based on actions of an account associated with the user identifier; conducting, by the server, the pre-authorization for the future recurring transaction using the data at a second timestamp earlier than the first timestamp and using the dynamic hold amount; when the pre-authorization fails: generating, by the server, an electronic message to a messaging account associated with the user identifier; and recalibrating, by the server, the second machine learning model.

In another embodiment, a non-transitory machine-readable storage medium comprises computer-executable instructions stored thereon that, when executed by one or more processors, cause the one or more processors to perform operations comprising receiving data associated with a future recurring transaction, the data comprising a user identifier, a transaction amount, and a payment identifier; executing a machine learning model to predict a first score corresponding to a likelihood of success for the future recurring transaction based on the data at a first timestamp; when the first score satisfies a first threshold indicating a potential failure of the future recurring transaction, executing a second machine learning model to predict whether a pre-authorization would increase the likelihood of success for the future recurring transaction, the second machine learning model further determining a dynamic hold amount for the pre-authorization based on actions of an account associated with the user identifier; conducting the pre-authorization for the future recurring transaction using the data at a second timestamp earlier than the first timestamp and using the dynamic hold amount; when the pre-authorization fails: generating an electronic message to a messaging account associated with the user identifier; and recalibrating the second machine learning model.

In yet another embodiment, a system comprises a processor configured to receiving data associated with a future recurring transaction, the data comprising a user identifier, a transaction amount, and a payment identifier; executing a machine learning model to predict a first score corresponding to a likelihood of success for the future recurring transaction based on the data at a first timestamp; when the first score satisfies a first threshold indicating a potential failure of the future recurring transaction, executing a second machine learning model to predict whether a pre-authorization would increase the likelihood of success for the future recurring transaction, the second machine learning model further determining a dynamic hold amount for the pre-authorization based on actions of an account associated with the user identifier; conducting the pre-authorization for the future recurring transaction using the data at a second timestamp earlier than the first timestamp and using the dynamic hold amount; when the pre-authorization fails: generating an electronic message to a messaging account associated with the user identifier; and recalibrating the second machine learning model.

In an embodiment, a method comprises receiving, by a server, data associated with a future recurring transaction, the data comprising a user identifier, a transaction amount, and a payment identifier; executing, by the server, a first machine learning model to predict a first score corresponding to a likelihood of success for the future recurring transaction using the data at a first timestamp; when the first score satisfies a first threshold corresponding to a potential failure of the future recurring transaction based on the likelihood of success: executing, by the server, a second machine learning model to predict a second score corresponding to a likelihood of an increase of the first score by conducting a pre-authorization for the future recurring transaction using the data at a second timestamp earlier than the first timestamp, wherein conducting the pre-authorization for the future recurring transaction comprises determining a dynamic hold amount for the pre-authorization based on actions of an account associated with the user identifier; when the second score satisfies a second threshold corresponding to a potential improvement of the likelihood of the increase of the first score: instructing, by the server, a second server to conduct the pre-authorization for the future recurring transaction at the second timestamp using the dynamic hold amount; and when the pre-authorization fails: generating, by the server, an electronic message to a messaging account associated with the user identifier; and recalibrating, by the server, the second machine learning model.

In another embodiment, a non-transitory machine-readable storage medium comprises computer-executable instructions stored thereon that, when executed by one or more processors, cause the one or more processors to perform operations comprising receive data associated with a future recurring transaction, the data comprising a user identifier, a transaction amount, and a payment identifier; execute a first machine learning model to predict a first score corresponding to a likelihood of success for the future recurring transaction using the data at a first timestamp; when the first score satisfies a first threshold corresponding to a potential failure of the future recurring transaction based on the likelihood of success execute a second machine learning model to predict a second score corresponding to a likelihood of an increase of the first score by conducting a pre-authorization for the future recurring transaction using the data at a second timestamp earlier than the first timestamp, wherein to conduct the pre-authorization for the future recurring transaction comprises to determine a dynamic hold amount for the pre-authorization based on actions of an account associated with the user identifier; when the second score satisfies a second threshold corresponding to a potential improvement of the likelihood of the increase of the first score instruct a second server to conduct the pre-authorization for the future recurring transaction at the second timestamp using the dynamic hold amount; and when the pre-authorization fails: generate an electronic message to a messaging account associated with the user identifier; and recalibrate the second machine learning model.

In yet another embodiment, a system comprises a processor configured to receive data associated with a future recurring transaction, the data comprising a user identifier, a transaction amount, and a payment identifier; execute a first machine learning model to predict a first score corresponding to a likelihood of success for the future recurring transaction using the data at a first timestamp; when the first score satisfies a first threshold corresponding to a potential failure of the future recurring transaction based on the likelihood of success: execute a second machine learning model to predict a second score corresponding to a likelihood of an increase of the first score by conducting a pre-authorization for the future recurring transaction using the data at a second timestamp earlier than the first timestamp, wherein to conduct the pre-authorization for the future recurring transaction comprises to determine a dynamic hold amount for the pre-authorization based on actions of an account associated with the user identifier; when the second score satisfies a second threshold corresponding to a potential improvement of the likelihood of the increase of the first score: instruct a second server to conduct the pre-authorization for the future recurring transaction at the second timestamp using the dynamic hold amount; and when the pre-authorization fails: generate an electronic message to a messaging account associated with the user identifier; and recalibrate the second machine learning model.

BRIEF DESCRIPTION OF THE DRAWINGS

Non-limiting embodiments of the present disclosure are described by way of example with reference to the accompanying figures, which are schematic and are not drawn to scale. Unless indicated as representing the background art, the figures represent aspects of the disclosure.

FIG. 2 illustrates a flow diagram of a process executed in a subscription service transaction method, according to an embodiment.

FIG. 4 illustrates a flow diagram of a process executed in a subscription service transaction method, according to an embodiment.

DETAILED DESCRIPTION

Figure 1:
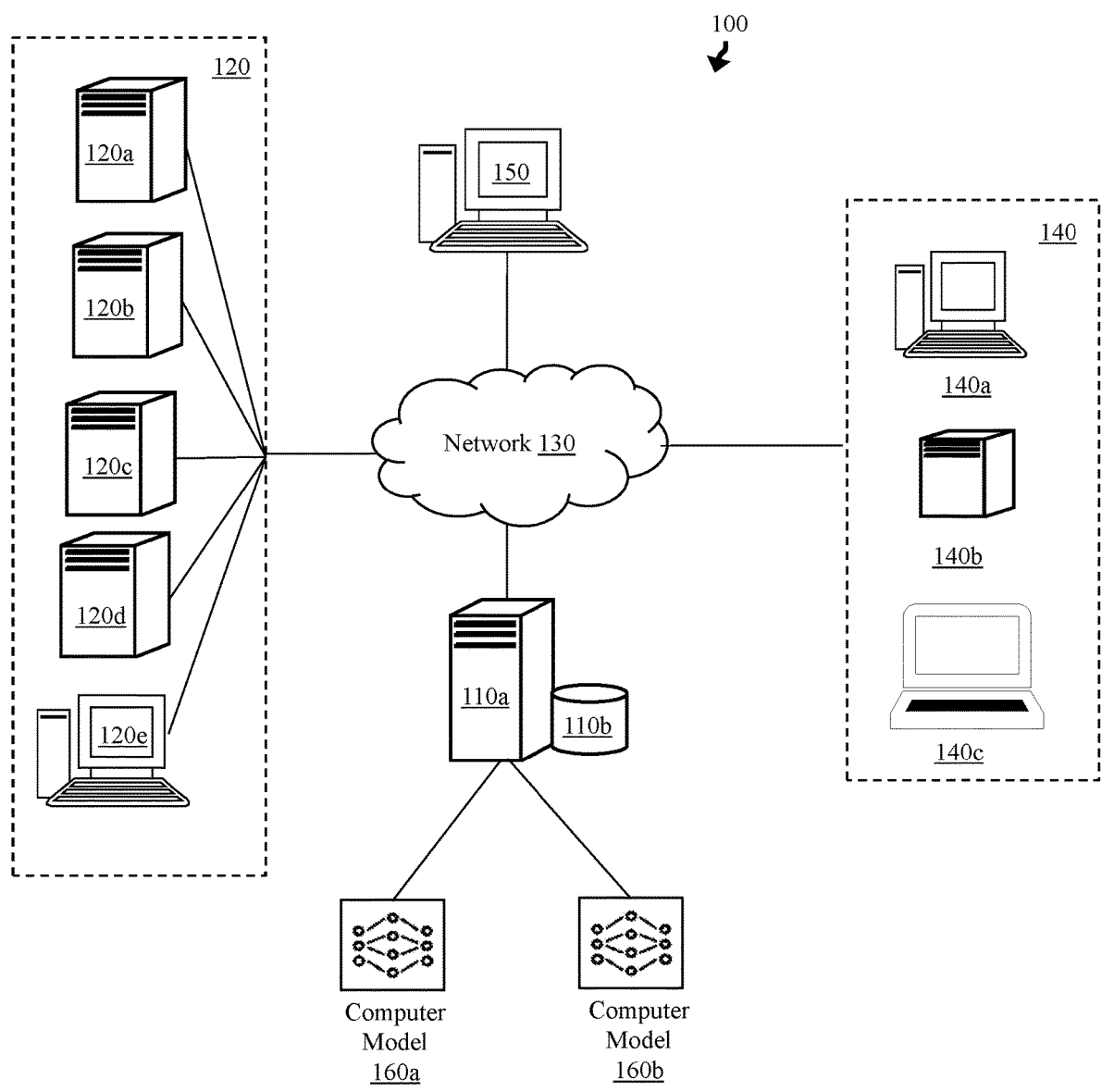
FIG. 1 illustrates various components of a subscription service transaction system/method, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein— and additional applications of the principles of the subject matter illustrated herein—that would occur to one skilled in the relevant art and having possession of this disclosure are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

FIG. 1 is a non-limiting example of components of a subscription service transaction system (system 100) in which a transaction server 110*a* operates. The transaction server 110*a* may utilize features described in FIG. 1 to retrieve/analyze data and determine the likelihood of the succession of a future transaction (e.g., recurring transaction, such as a subscription) using the machine-learning models discussed herein. The transaction server 110*a* may be communicatively coupled to a system database 110*b*, user devices 140*a-c* (collectively user devices 140), and an administrator computing device 150. The transaction server 110*a* may also use various computer models (e.g., the computer models 160*a-f*) to analyze the data.

The system 100 is not confined to the components described herein and may include additional or other components not shown for brevity, which are to be considered within the scope of the embodiments described herein. The system 100 may also include other servers 120*a-e*, which serve to conduct a pre-authorization for the future transaction responsive to a score calculated by the second computer model 160*b* when a second score satisfies a second threshold corresponding to a potential improvement of the likelihood of the increase of a first score.

The above-mentioned components may be connected to each other through a network 130. The examples of the network 130 may include, but are not limited to, private or public LAN, WLAN, MAN, WAN, and the Internet. The network 130 may include both wired and wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), and/or EDGE (Enhanced Data for Global Evolution) network.

The transaction server 110*a* may be configured to receive data (e.g., data associated with a future transaction) and use the data at a first timestamp with a machine-learning model (e.g., the first computer model 160*a*) to predict a first score corresponding to a likelihood of success for the future transaction. The transaction server 110*a* may also be configured to execute another machine learning model (e.g., the second computer model 160*b*) when the first score satisfies a threshold to predict a second score corresponding to a likelihood of an increase of the first score by placing a pre-authorization for the future transaction. The transaction server 110 may receive the data directly from a user (e.g., the user subscribed to the subscription service performing the transaction), an entity (e.g., a bank, credit card company, or credit bureau, among others) result or from another processor (not shown) associated with an electronic payment system. In some embodiments, a user (e.g., a merchant) and/or a system administrator (operating the administrator computing device 150) may use a platform (hosted by the transaction server 110 or a third party) to transmit the request to the transaction server 110. The platform may include one or more graphical user interfaces (GUIs) displayed on the user device 140 and/or the administrator computing device 150.

An example of the platform generated and hosted by the transaction server 110*a* may be a web-based application or a website configured to be displayed on various electronic devices, such as mobile devices, tablets, personal computers, and the like. The platform may include various input elements configured to receive requests related to the transaction or the subscription service. For instance, a user may access the platform to initiate a transaction. Using the platform, the user may select the transaction to be processed and may provide a means of payment for the transaction. In some embodiments, the user may instruct the transaction server 110 to begin a subscription service, cancel a subscription service, or otherwise modify a subscription service.

The subscription service can be or include software or hardware that performs transactions to provide a service or good to the subscribed user at predetermined intervals. The subscribed user may, using the platform, determine an interval of time or time at which the subscription service is to provide the good or service. In this way, the subscription service can provide the goods or services at a period defined by the subscription service or the subscribed user. The subscription service can provide the goods or services to the subscribed user virtually. For example, the good or service can include a service provided via the platform, as part of a software as a service (SaaS) agreement, access to a database for reading or writing (e.g., cloud storage services or research database access), or any other service or application. In some examples, a subscription service may result in different charges per payment cycle depending on the tier of goods provided, such as upgrading a service, on-demand purchases, etc. The subscription service can provide the goods or services to the subscribed user physically. For example, the good or service can be delivered to the subscribed user at an address associated with the subscribed user, such as a regular floral, clothing, newspaper, food, housekeeping, or other such good or service. In some cases, the subscription service can provide the good or service at irregular intervals or only when requested by the subscribed user. For example, the subscribed user may request the good from the subscription service once and not as a recurring good.

The recurring transactions performed by the subscription service can include a payment, deduction, or other agreement from the subscribed user in exchange for the goods or services provided by the subscription service. For example, the transactions can include a charge to an account associated with the subscribed user. The account may include a payment identifier that identifies a type (e.g., credit company) or number of a credit card, debit card, routing number, bank account, or other medium by which to provide payment as a part of the transaction. The transaction may include a charge, hold, freeze, pause, or other action performed on the account on behalf of the subscription service. In this manner, the transaction can be a subscription transaction occurring periodically. The subscription service can be performed by or in communication with the transaction server 110a.

The transaction server 110a may be any computing device comprising a processor and non-transitory, machine-readable storage capable of executing the various tasks and processes described herein. The transaction server 110a may employ various processors, such as a central processing unit (CPU) and graphics processing unit (GPU), among others. Non-limiting examples of such computing devices may include workstation computers, laptop computers, server computers, and the like. While the system 100 includes a single transaction server 110a, the transaction server 110a may include any number of computing devices operating in a distributed computing environment, such as a cloud environment.

The computer models 160 may represent a collection of various computer models that use algorithmic and/or artificial intelligence modeling techniques to determine scores associated with different transactions. In some embodiments, different computer models may be configured to determine different scores using different methods and/or may be trained differently. For instance, the computer model 160a may be trained and calibrated to predict a first score corresponding to a likelihood of success for the future transaction, and the computer model 160b may be calibrated to determine a second score corresponding to a likelihood of an increase of the first score. Therefore, the computer models 160 may be a collection of different models with different operational parameters.

In some embodiments, a group of the computer models may belong to the same model. That is, in some embodiments, a single model may include various sub-models. Segmenting a single machine-learning model into different sub-models can be a powerful approach to tackle complex tasks, such as detecting and determining metrics for the likelihood of success of a future transaction.

In some embodiments, a single computer model may be partitioned based on specific feature subsets. By identifying various aspects or characteristics of the input data, sub-models can be trained to specialize in each subset. For example, the computer model 160a may focus on determining the first score among a first type of user identifier, while another sub-model may concentrate on determining the first score among a second type of user identifier. Each sub-model may operate independently on its designated feature subset, allowing for parallel processing and efficient utilization of computational resources. In some embodiments, the transaction server 110 may execute multiple sub-models. It is understood that the present disclosure can apply to models or sub-models or models. As described herein, the transaction server 110a may use various methods to determine the likelihood of success of a future transaction and actions to perform to reduce the likelihood of failure of the future transaction.

User devices 140 may be any computing device comprising a processor and a non-transitory, machine-readable storage medium capable of performing the various tasks and processes described herein. Non-limiting examples of the user devices 140 are a workstation computer, laptop computer, phone, tablet computer, and server computer. During operation, various users may use user devices 140 to conduct a transaction. Even though referred to herein as "user" devices, these devices may be operated by any party associated with a transaction. For instance, a tablet 140c may be used by a merchant (or another person on behalf of a merchant), a loan applicant, a customer, or the like. In another example, the user devices 140 may include a point-of-sale terminal or a card reader.

The administrator computing device 150 may represent a computing device operated by a system administrator. The administrator computing device 150 may be configured to monitor various attributes generated by the transaction server 110a (e.g., a suitable service provider or various analytic metrics (e.g., the scores) determined during training of one or more machine-learning models and/or systems); monitor one or more computer models 160 utilized by the transaction server 110a and/or user devices 140; review feedback; and/or oversee the servers 120 communicated with by the transaction server 110a.

In operation, the transaction server 110a may receive data associated with a future transaction, including a user identifier, a transaction amount, and a payment identifier. Using the methods discussed herein, the transaction server 110a may execute the first machine-learning model 160a and generate a first score corresponding to a likelihood of success for the future transaction using the data at a first timestamp. When the first score satisfies a first threshold, the transaction server 110a may execute a second machine learning model to predict a second score corresponding to a likelihood of an increase of the first score. The second score can correspond to a likelihood of the increase of the first score if the transaction server 110a authorizes a pre-authorization for the future transaction. The transaction server 110a may, upon the second score satisfying a second threshold, instruct a second server (e.g., a second server 120a) to conduct the pre-authorization. The transaction server 110a may, when the pre-authorization fails, generate an electronic message to transmit to an account associated with the user identifier.

FIG. 2 illustrates a flow diagram of a process executed in a subscription service transaction method, according to an embodiment. The method 200 includes steps 210-250. However, other embodiments may include additional or alternative execution steps or may omit one or more steps altogether. The method 200 is described as being executed by a server, similar to the transaction server described in FIG. 1. However, one or more steps of method 200 may also be executed by any number of computing devices operating in the distributed computing system described in FIG. 1. For instance, one or more computing devices (e.g., user devices) may locally perform some or all of the steps described in FIG. 2.

Using the methods and systems described herein, such as the method 200, the transaction server may receive data associated with a future transaction. The transaction server may provide the data to one or more computer models to determine scores related to the likelihood of success of the future transaction. The computer models may be machine-learning models that can determine a likelihood of success of a future transaction based on a variety of conditions, such as the effect on the likelihood as a result of placing a hold on an account associated with the transaction. The computer models may determine scores, and the transaction server may perform actions related to the scores to improve the likelihood of the success of the transaction.

At step 210, the transaction server may receive, from a computing device, data associated with a future transaction. The data may include a user identifier, a transaction amount, and a payment identifier. The transaction server may receive the data from one or more disparate sources. For example, the transaction server may receive the data from an account associated with a user, from a database of transactions, from user input, from an administrator device, among others.

The data may include a user identifier. The user identifier can identify a user of the subscription service for which one or more future transactions are to be processed. The user identifier can identify attributes of the user such as a name, address, demographic information, client device associated with the user, and historic transactions performed by the user, among others.

The data may include a transaction amount. The transaction amount can be an amount of money, tokens, points, or other such denomination that is to be charged to the user in the future transactions. The transaction amount can be, for example, $5, 20 points, or any other denomination of currency.

In some cases, the subscription service may perform a recurring transaction, including the transaction amount. For example, the subscription service can charge the transaction amount periodically as a part of a recurring transaction.

The transaction server may identify the transaction amount from a list of historic transactions included in the account of the user. The list of historic transactions can include information about recurrent transactions. The information about recurrent transactions can include a merchant type (e.g., a vendor or entity enacting the transaction or providing the good or service), a periodicity (e.g., how often or at what time interval the recurrent transaction occurs), the respective transaction amount of each historic transaction, a duration of the subscription service for which a recurrent transaction has been occurring, goods or services indicated in the transaction, among others.

The data may include a payment identifier. The payment identifier can correspond to a method of payment for the transaction amount. The payment identifier may identify a payment method associated with the user identifier. For example, the payment identifier can identify a credit card, bank account, debit card, routing number, or other such payment identifier associated with the user identifier for processing the future transaction.

The data may be stored in an account associated with a user of the subscription service. In some cases, the account can store the user identifier, the transaction amount, or the payment identifier, among others. The account can include historic transactions related to the user, such as a time of day of the transaction, a frequency of the transaction, how many transactions were successful or unsuccessful, among others. The account of the user can include the attributes of the user and can be updated responsive to inputs from the user, the transaction server, or a combination thereof.

The transaction server may receive or retrieve the data at any time. The transaction server may aggregate the data over a period of time. The transaction server may receive the data responsive to a change in a score calculated by a computer model, a scheduled data retrieval, and/or a change in an account associated with the future transaction, among others.

At step 220, the transaction server may execute a first machine-learning model to predict a first score corresponding to a likelihood of success for the future transaction using the data at a first timestamp.

The first machine-learning model may first use a collection of algorithms, including, but not limited to, machine-learning algorithms, to determine the first score using the data associated with the future transaction at a first timestamp. That is, the machine-learning model can accept as input the data associated with the future transaction to determine the first score for the first timestamp. The data at the first timestamp can include the aggregated data up to the first timestamp, the data at the first timestamp or within a threshold range of the first timestamp, or the data up to the present or most recent data. In some cases, the first timestamp can be in the future. The first timestamp can correspond to a due date of a payment for the subscription service. For example, the first score can indicate a likelihood of the success of the transaction processed at the due date of the payment for the subscription service.

Based on the user identifier, the payment identifier, and the transaction amount, the first machine learning model can determine the first score. The first score can indicate a likelihood of success for the future transaction. Success of the future transaction can refer to the likelihood that the future transaction is processed (e.g., payment is received from the user for the subscription service). The first machine learning model can determine the first score using historical transaction information. For example, the first machine learning model can determine, based on a pattern of historic transactions conducted by the user, whether the future transaction is likely to succeed. In some embodiments, the first machine learning model can determine the first score based on historical transactions associated with other accounts, such as accounts with similar identifiers, transaction amounts, or payment identifiers.

At step 230, the transaction server may determine that the first score satisfies a first threshold. The transaction server may determine whether the future recurring transaction is likely to succeed. In order to make this determination, the transaction server may use a threshold. The threshold may be inputted by a system administrator and/or selected as a default threshold. In a non-limiting example, the threshold may be set to 50%. Therefore, if the future recurring transaction has a likelihood of success (the first score) that is higher than 50%, the transactions determines that the transaction is likely to succeed.

If the transaction server determines that the transaction is likely to succeed ("yes" branch), the transaction server may process the transaction at the first timestamp (step 232).

When the first score satisfies the first threshold (the "no" branch), at step 240 (thereby indicating that the future transaction will likely fail), the transaction server may execute a second machine-learning model to predict a second score.

The second score may be used to determine whether pre-authorizing the future recurring transaction will increase the chance of transaction succeeding. For instance, if a transaction is likely to fail, the second machine learning model may determine whether putting a hold on the user account would increase the likelihood of the transaction succeeding. The second machine learning model may also determine when to put the hold on the user account (e.g., at a time earlier than the transaction is scheduled). Moreover, the second machine learning model may predict a hold amount for the pre-authorization. The hold amount may be static or dynamic. For instance, the hold amount may increase or decrease based on the user account's activity.

In a non-limiting example, a recurring transaction is scheduled for November 15$^{th}$ for $100. On November 1$^{st}$, the transaction server may execute the first machine learning model and determine that the transaction will likely fail (75% chance of failure). As a result, the transaction server may execute the second machine learning model. The second machine learning model predicts that the transaction will succeed if a hold of $60 is placed on the user's credit card on November 12$^{th}$. The $60 may be a dynamic amount that may depend on the user's account activity. For instance, if the user conducts a transaction of $1500 before November 12$^{th}$, the hold amount of $60 may be increased to $80.

The second score may correspond to a likelihood of an increase in the first score by conducting a pre-authorization for the transaction using the transaction data at a second timestamp earlier than the first timestamp. That is, the second score may determine whether putting a hold on the user account (pre-authorizing the transaction) will increase the likelihood of success for the transaction.

As discussed herein, pre-authorizing the future transaction can include placing a hold on a payment method (e.g., user account) at the second timestamp (e.g., before the due date of the subscription service) associated with the account, such as reserving funds or indicating that the funds are to be charged or withdrawn at the first timestamp, such as putting a hold on an account at a time before the scheduled transaction.

Pre-authorizing the transaction can also include determining the second timestamp (e.g., how early to put the hold on the user account). The second timestamp can be before or prior to the first timestamp (e.g., when the transaction may be performed). The transaction server can determine the second timestamp based on the account associated with the user. The time of the pre-authorization can correspond to various attributes of the user and or their account. For instance, the time of the pre-authorization may be based on previously successful or unsuccessful transactions, times of transactions, previous pre-authorizations (e.g., if a user has multiple other holds on their account), previous spend or credit limits (e.g., users with lower credit limits), among others. In some embodiments, the transaction server may identify one or more historic transactions of the account and may determine the second timestamp based on a period of time prior to a transaction being charged that is successful. For instance, Pre-authorizing the transaction can include determining a dynamic hold amount for the pre-authorization. A dynamic hold amount can be an amount of money, currency, points, etc., to reserve on the account associated with the user in anticipation of the future recurring transaction. The transaction server can determine the dynamic hold amount based on the actions of the account associated with the user, such as amounts of previous pre-authorizations, amounts of historic transactions, historic deposits, withdrawals, or charges, among others. The second machine-learning model can be initially trained using a training dataset including a set of historic pre-authorized transactions and whether the set of historic pre-authorized transactions increased a likelihood of success for a set of corresponding transactions.

In a non-limiting example, a user may have scheduled a monthly subscription transaction for $200. The transaction server may determine that the next subscription transaction will likely fail (e.g., the transaction server may execute the first machine learning model to determine that the transaction will likely fail). As a result, the transaction puts a hold on the user's account for $100 three days before the scheduled subscription transaction (in order to improve the likelihood that the scheduled subscription amount succeeds). However, two days before the scheduled subscription transaction, the user spends $600 using the same payment method (e.g., same credit card or bank account) as the scheduled subscription transaction. As a result, the transaction server may increase the hold amount to $200. If the hold fails, the transaction server may move to the step 250.

For example, the training dataset can include a listing of historically pre-authorized transactions, data associated with those transactions (e.g., user identifiers, payment identifiers, transaction amounts, first scores calculated by the first machine-learning model, among others), and an indication if each historically pre-authorized transaction was successful at the first timestamp or the second timestamp. The second machine-learning model can be continuously trained based on a growing number of historically pre-authorized transactions, successful transactions, unsuccessful transactions, and data associated with each transaction. In this way, the second machine-learning model can improve through bootstrapping (e.g., adding additional training data for the second machine-learning model as the second machine-learning model performs its functionalities described herein).

In some embodiments, the data included within the training dataset may correspond to recurring transactions only, such as historic subscription transactions conducted. However, in some embodiments, the training data may correspond to all transactions (whether failing or succeeding) regardless of whether the underlying transactions are recurring or not.

The first and second machine-learning models may be trained to uncover hidden patterns, such that each score is customized for each future transaction, customer, and/or the subscription service. For instance, instead of using static algorithms (used by conventional systems and models), the first and second machine-learning models may consider all the data discussed herein, such that the score is customized for the request. For instance, the second score may correspond to the future transaction, transaction data, merchant data, customer data, and/or the like. That is, the same model may determine different scores based on the data ingested by the model.

The future transaction may also include or identify a set of sub-models of the first and second machine-learning models to be used to determine the first and second scores, respectively. In some embodiments, certain sub-models may be designated as the preferred or flagship models for certain user identifiers, subscription services, historical transaction patterns associated with the account, transaction amounts, or payment identifiers, among others. For instance, a processor associated with a subscription service for paper towels may include a request for a subset of the first and second machine learning models trained using subscription services related to paper goods, training data, or otherwise calibrated to evaluate paper towel subscription transactions. In another example, a request may identify a set of sub-models that are calibrated for a particular merchant's attribute (e.g., sales level, geographical location, or membership level) or calibrated for a particular transaction (e.g., grocery products or home improvement merchandise).

In some cases, the second machine learning model may predict a likelihood of a dispute associated with the future transaction. Upon processing the future transaction, the user identified by the user identifier may dispute, disagree with, or challenge a charge to the payment method identified by the payment identifier. The user may dispute the charge with a credit card company, a bank, a loan service, or with the subscription service. The second machine learning model can determine, based on the data, a likelihood of a dispute with the future transaction.

At step 250, the transaction server may determine if the score satisfies a second threshold. The second threshold may correspond to the potential improvement of the likelihood of the increase of the first score. That is to say, when the second score satisfies the threshold, the likelihood of success of the future transaction can be increased by pre-authorizing the future transaction at the second timestamp. The second threshold may correspond to the improvement of the likelihood of success in absolute terms (e.g., the transaction will be successful at a rate of 75%) or an improvement of the likelihood of success (e.g., the transaction will improve its likelihood of success by 50%). With this inquiry, the transaction server may determine whether pre-authorization can increase the success of the future recurring transaction. Therefore, the second threshold indicates whether the first score (likelihood of success for the transaction) can be improved.

If the second score does not satisfy the second threshold ("no" branch), the transaction server may determine that even putting a hold or pre-authorizing the transaction will not likely help. As a result, the transaction server may generate a message to transmit to the subscribed user associated with the future transaction. The message may indicate to the user that the transaction is likely to fail, may remind the subscribed user of the upcoming due payment, or may request an alternate payment method to be input by the user (step 252).

If the second score satisfies the second threshold ("yes" branch), the transaction server determines that it is likely that the first score may increase by pre-authorizing the future transaction at the second timestamp. That is, the transaction server will proceed with putting a hold on the user's account (the step 260.)

At step 260, the transaction server may instruct a second server to conduct the pre-authorization for the future transaction at the second timestamp when the second score satisfies a second threshold.

The transaction server may generate instructions to transmit to the second server. The instructions may include the transaction amount, the first timestamp, the second timestamp, the payment identifier, or the user identifier, among others. The instructions may cause the second server to conduct the pre-authorization for the future transaction. In some cases, the second server is included in or operated by the transaction server. The transaction server can be or include the second server. For instance, the transaction server may implement the preauthorization itself by placing a hold on the user's credit card.

Conducting the pre-authorization can include the second server placing a hold on the account associated with the future transaction. A pre-authorization amount can be proportional to one or more of the first score, the second score, or the transaction amount. In some cases, the pre-authorization amount can be equal to the transaction amount, greater than the transaction amount, or less than the transaction amount. In some cases, the pre-authorization amount can be inversely proportional to the likelihood of the success of the future transaction. In some cases, the pre-authorization amount can be proportional to the likelihood of an increase in the first score. That is, a higher likelihood of the increase of the first score may correspond to a higher pre-authorization amount.

At step 270, the transaction server may determine whether the pre-authorization was successful. The pre-authorization being successful can refer to the hold being appropriately placed on the payment method associated with the payment identifier to reserve funds at the second timestamp to withdraw or charge the transaction amount at the first timestamp. If the pre-authorization is successful, the transaction server may end the process (step 272). The transaction server may continue the pre-authorization (e.g., hold on the account) until the first timestamp (e.g., the time of the future recurring transaction). At that time, the actual transaction (and not the pre-authorization) can be conducted.

Additionally, or alternatively, the second machine-learning model may re-determine the second timestamp or the dynamic hold amount upon conducting the pre-authorization due to additional activities (e.g., second actions) performed by the account. In some cases, the user associated with the account may perform second actions that may affect the dynamic hold amount and/or the second timestamp. For example, upon the second server placing the hold on the account at the second timestamp and for the dynamic hold amount, the user may make one or more additional transactions (e.g., pay off a portion of the balance of a credit card, withdraw funds from an account, make an additional charge on a credit card, etc.). Upon the user performing the second actions (e.g., the one or more additional transactions) between the second timestamp and the first timestamp, the transaction server may re-determine the dynamic hold amount and/or the second timestamp based on the seconds actions.

In some cases, the transaction server may remove the pre-authorization upon redetermining the second timestamp or the dynamic hold amount. For example, the transaction server may identify that the second actions indicate that the first score no longer satisfies the first threshold, and therefore, the pre-authorization can be removed. In some cases, the transaction server may change the dynamic hold amount currently enacted on the account. For example, the transaction server may instruct the second server to update, remove, increase, or decrease the dynamic hold amount. In some cases, the transaction server may change the second timestamp such that the pre-authorization occurs at a later time but still prior to the first timestamp.

In some cases, upon a successful pre-authorization, the transaction server may determine a third score corresponding to an action that affects the future transaction, such as the second actions. For example, upon placing the successful pre-authorization, the user may perform one or more actions, which affects the likelihood of the future transaction to succeed. Such actions may include a withdrawal of funds to a bank account identified by the payment identifier, a deposit of funds to the bank account, charges placed on a credit card identified by the payment identifier, or a payment to the credit card. The transaction server can determine to re-execute the first machine-learning model, the second machine-learning model, or both, responsive to a determination that an action which may affect the likelihood of the future transaction succeeding has occurred. Some of these actions, such as a withdrawal of funds or charges to the credit card, may cause the likelihood of the success of the future transaction to decrease. Upon determining (based on a type of the action or re-executing the first and/or second machine-learning model) that the likelihood of success of the future transaction has decreased below the first threshold or the likelihood of the increase of the first score has decreased below the second threshold, the transaction server may instruct the second server to increase an amount of the pre-authorization.

If the pre-authorization is not successful, the transaction server may move to the step 280. The pre-authorization may fail or not be successful if there are insufficient funds associated with the payment method identified by the payment identifier. For example, attempting to place a pre-authorization on a credit card at its limit or a bank account with funds less than the transaction amount may result in a failed pre-authorization.

At step 280, the transaction server generates an electronic message to a messaging account associated with the user identifier and recalibrates the second machine-learning model upon the failure of the pre-authorization. After conducting the pre-authorization by the second server, the pre-authorization may fail or not hold the appropriate amount of funds. The transaction server may generate a message to transmit to an account (via a platform operating on a device of the user) associated with the user identifier.

The message can include a request for a second payment identifier. The second payment identifier can correspond to a second payment method with which to process the future transaction. In some cases, the transaction server may perform the operation described herein using the second payment identifier. The user may provide the second payment identifier via the account associated with the user identifier. In a non-limiting example, when the pre-authorization fails, the transaction server may transmit an electronic message to the user informing the user that the recurring transaction is probably going to fail and/or informing the user that a hold has been placed on their account. The electronic message may also request a secondary payment information (e.g., second credit card or account number), such that the recurring transaction can be conducted using the newly provided payment information.

In some embodiments, the user's interactions with the electronic message can be monitored. For instance, a user may automatically delete the message indicating a possible payment failure, never access the message (e.g., leave an email on "unread"), or may read the message in its entirety and/or provide a secondary payment information. These interactions can be aggregated and fed back into the machine learning models discussed herein, such that the machine learning models can recalibrate themselves accordingly.

Recurring transactions using preauthorization protocols may not account for a large portion of transactions implemented within an electronic payment system. Therefore, in some embodiments, the training data may not include a large amount of training data. As a result, the outcome of the predictions generated by the suite of machine learning models discussed herein can be used for recalibration and retraining purposes. In this way, the models discussed herein can use bootstrapping to achieve better results. In some embodiments, any data associated with the failed future recurring transaction may be used, such as whether/why the dynamic hold amount was adjusted, whether the message was ignored, whether secondary payment information was provided in proper time, and the like. In some embodiments, data associated with successful holds or transactions may also be used for recalibration purposes.

As an illustrative example, a first account may correspond to a first score, indicating a low likelihood of a first future transaction succeeding. The first account may be associated with a credit card to pay for a subscription charge as the first future transaction. The first account may include historical transactions related to the subscription charge. The second machine-learning model may determine that conducting a pre-authorization for the first future transaction may not increase the likelihood of the first future transaction occurring (e.g., the second score does not satisfy the second threshold). The transaction server may generate a message to transmit to the first account regarding the first future transaction. The message may alert the user associated with the account of the likelihood of success of the future transaction, may remind the user of the upcoming first future transaction, or may request an alternate method of payment for the first future transaction. For example, the message may request a different credit card number, debit card number, or banking info to charge to increase the likelihood of success of the first future transaction.

In some embodiments, the transaction server may monitor for a response to the message. As a result, the transaction server may calibrate the machine-learning models accordingly. For instance, the transaction server may generate a feedback loop in which the outcome of the routing and execution of the machine-learning models are used to improve the routing machine-learning model itself. For example, the transaction server may receive a response indicating the second payment identifier. The transaction server may calibrate the machine-learning models according to the second payment identifier. As another illustrative example, the transaction server may monitor for a non-response. For example, upon the elapse of a threshold period of time from presenting the message to the account, the transaction server may determine to recalibrate the second machine learning model based on the non-response.

In some cases, the transaction server can recalibrate the second machine learning model based on the success or failure of the future transaction. At the first timestamp, the transaction server may attempt to process the future transaction as a current transaction. The now-current transaction may succeed or fail. The second machine-learning model may include the success or failure of the current transaction as training data to further refine the determination of the second score.

Additionally, or alternatively, the transaction server may instruct the second server to pre-authorize the future transaction at a third timestamp. For instance, instead of charging the user's debit/credit card a subscription fee when the subscription becomes due, the transaction server may create a pre-authorization up to 7 days before the due date and attempt to preauthorize the transaction. If that fails, the transaction server may try the preauthorization at a later time (e.g., six days before the due date). In some embodiments, if that fails, the transaction server may try the preauthorization five days ahead and continue until the preauthorization succeeds. This way, the transaction server implements a "dunning process" that starts ahead of the actual payment collection, increasing the chances of a successful payment and potentially competing with other payments that will be attempted on the card.

Figure 3:
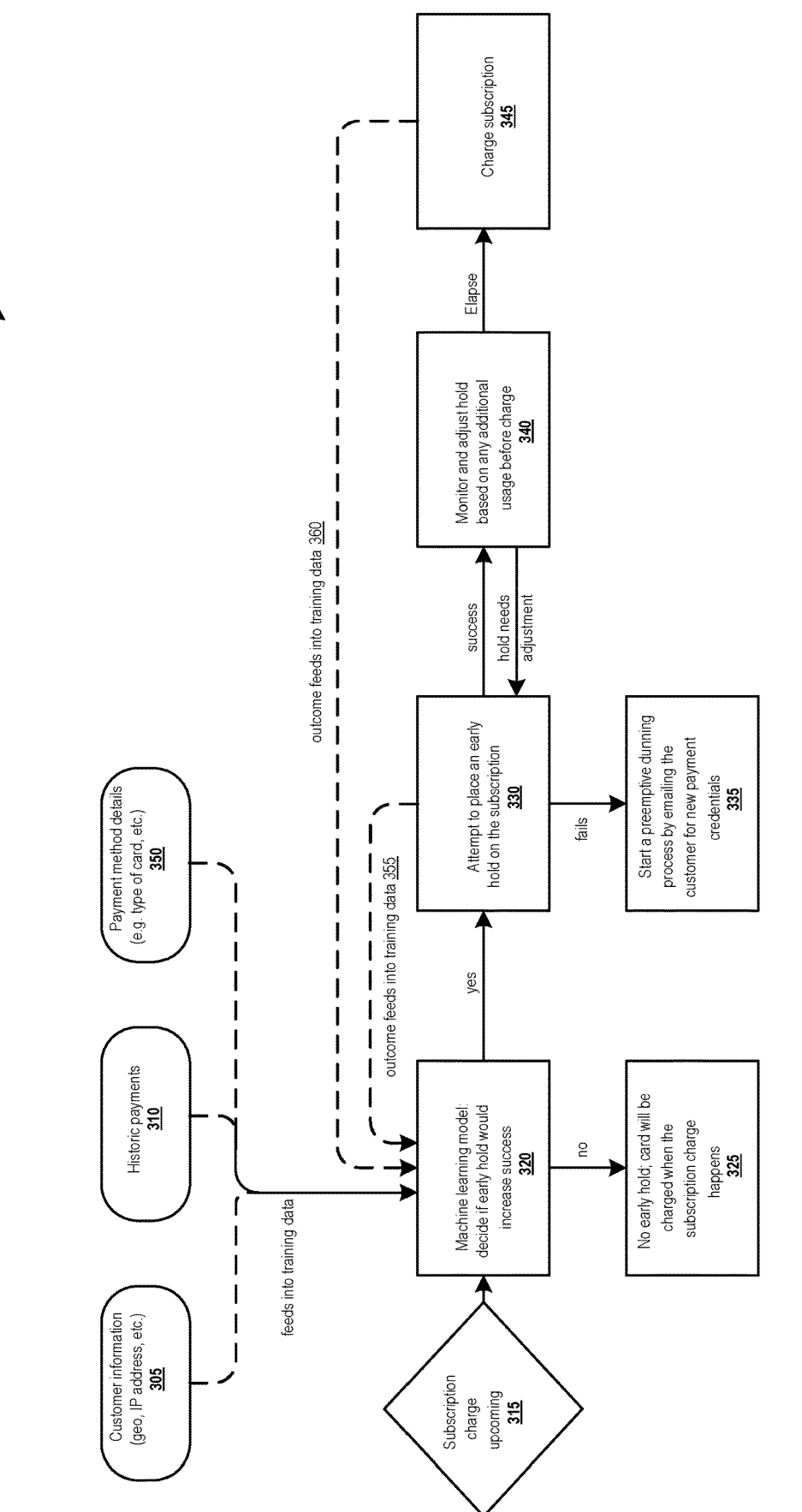
FIG. 3 illustrates a flow diagram of a process executed in a subscription service transaction system, according to an embodiment.

Referring now to FIG. 3, a method 300 illustrates a flow diagram of a process executed in the subscription service transaction method, according to an embodiment. The method flow 300 may contain steps 315-345. Other embodiments may include additional or alternative execution steps or may omit one or more steps altogether. The method 300 is described as being executed by a server, similar to the transaction server described in FIG. 1. However, one or more steps of method 300 may also be executed by any number of computing devices operating in the distributed computing system described in FIG. 1.

In some embodiments, the same server or processor (or servers/processors belonging to the same organization) may execute the first and second machine-learning models to generate scores related to the likelihood of success of a future transaction. For instance, the transaction server may execute the method 300 to determine a likelihood of success of an increase to a likelihood of success of a transaction by conducting a pre-authorization request for the future transaction.

As depicted in the method 300, at step 315, the transaction server may identify an impending subscription charge. An impending (upcoming) subscription charge can include a future recurring transaction, such as a charge for a subscription service occurring periodically. The transaction server can identify the subscription charge upcoming from the subscription service and/or from the account associated with the subscribed user.

At step 320, a machine learning model (e.g., the first machine learning model, the second machine-learning model, or a combination thereof) may take as input a variety of data. The variety of data can include customer information 305 (e.g., location, an IP address, a user identifier, etc.), historic payments 310 (e.g., historic transactions of the customer or of a multitude of customers), and/or a payment method 350 (e.g., a type of credit card vendor, a credit limit amount, the expiration date of the credit card, or other payment identifiers). The machine-learning model may ingest this data at a first timestamp, such as seven days prior to the execution of the future transaction.

At step 325 (e.g., the "no" branch), the machine-learning model determines that a pre-authorization (e.g., an early hold) may not increase the likelihood of the future transaction succeeding. Upon a determination that the early hold may not increase the likelihood of the future transaction succeeding, the transaction server may charge the payment method at the time indicated by the subscription service (e.g., the due date of the payment).

At step 330 (e.g., the "yes" branch), the machine-learning model determines that a pre-authorization (e.g., an early hold) may increase the likelihood of the future transaction succeeding. Upon a determination that the early hold may increase the likelihood of the transaction succeeding, the transaction server may attempt to cause an early hold to be placed for the subscribed user. Data associated with the hold may be collected and used to recalibrate the machine learning model (step 355). For instance, the data monitored may indicate that the hold amount was adjusted due to the user's excessive spending. In another example, the data may indicate that putting a hold on the user's account was not successful because it failed due to a lack of sufficient balance/credit limit.

At step 335, the attempt to place the early hold fails. The attempt to place the early hold may fail due to the credit card provider, or a lack of funds associated with the payment method to place the early hold, among others. Upon the attempt to place the early hold failing, the transaction server may transmit a message to the subscribed user (e.g., customer). The message may include text describing that a hold has failed. The message may then request a new payment method from the customer, such as a new credit card number and/or other payment methods (e.g., login credentials or authorization to access an account of the customer).

At step 335, the transaction server may start a pre-emptive dunning process by transmitting a message to the customer. The transaction server may transmit the message via an account associated with the subscribed user. The transaction server may transmit the message via SMS, MMS, email, and phone call, among other messaging techniques. The message may request a different payment method to process the future transaction. For example, the message may include a request for a different payment method (e.g., new payment credentials, a different type of card, a different credit card number, etc.).

At step 340, the attempt to place the early hold succeeds. The transaction server may monitor and adjust the early hold based on additional usage prior to the subscription charge. The early hold may be maintained by the transaction server until the future transaction is processed. In some cases, the amount of the hold (e.g., the dynamic hold amount) may be adjusted based on actions (e.g., additional usage) of the subscribed user during the hold period (e.g., prior to the subscription charge). For example, increasing a credit limit of a credit card associated with the hold or adding to the balance of the credit card may cause the transaction server to re-calculate a hold amount. Other examples may include a sudden spike in spending by the customer.

At step 345, upon the elapse of the hold period (e.g., upon the due date of the subscription) the transaction service charges the payment method. The transaction may be successful or unsuccessful. With a successful transaction, the transaction amount may be transferred from the account associated with the user to the subscription service.

Throughout the operations described herein, the changes in the likelihood of success of the future transaction and data associated with the future transaction can be provided to the machine-learning model to provide further training. For example, outcomes from each step, such as applying the hold, determining if the hold would increase success or a successful or unsuccessful transaction, may be iteratively fed into the machine-learning model to fine-tune the machine learning model to provide more accurate predictions. The data may then be used to improve one or more models discussed herein. That is, the transaction server may generate a feedback loop.

The transaction server may monitor and record historical transactions. As discussed herein, the transaction server may monitor and record data associated with the execution of one or more machine-learning models to determine a likelihood of success of a future transaction. The transaction server may also monitor and collect data associated with the execution of the machine-learning models themselves when generating scores. For instance, the transaction server may monitor and record how the routing machine-learning model generates a score.

The transaction server may aggregate the data monitored and collected in order to generate a training dataset. In some embodiments, the transaction server may perform various clean-up protocols to achieve better model training, such as refining the aggregated data. For instance, the transaction server may de-duplicate various data points, change various frequencies to achieve more uniform data distribution, and/or aggregate or eliminate outliers or data records. Using the methods and systems discussed herein, the performance of one or more sub-models can also be improved. This can be mainly because the sub-models receive and analyze data that they are configured to (and known to) analyze better than other sub-models.

As depicted, the outcome of the transaction may be fed back into the machine learning model (step 360). Therefore, the machine learning model may use the outcome data (360 and 355) in addition to its initial training data (305, 310, and 350).

FIG. 4 illustrates a flow diagram of a process executed in a subscription service transaction method, according to an embodiment. The method 400 includes steps 410-470. However, other embodiments may include additional or alternative execution steps or may omit one or more steps altogether. The method 400 is described as being executed by a server, similar to the transaction server described in FIG. 1. However, one or more steps of method 200 may also be executed by any number of computing devices operating in the distributed computing system described in FIG. 4. For instance, one or more computing devices (e.g., user devices) may locally perform some or all of the steps described in FIG. 4. The method 400 may represent a non-limiting example of implementing the methods and systems discussed herein.

At step 410, the transaction server may receive data associated with a future recurring transaction, the data comprising a user identifier, a transaction amount, and a payment identifier. Similar to the step 210 in FIG. 2, the transaction server may identify a recurring future transaction, such as a subscription transaction for a user. The transaction server may query one or more databases and identify subscription transactions within the next two weeks (or other time windows).

At step 420, the transaction server may execute a first machine learning model to predict a first score corresponding to a likelihood of success for the future recurring transaction based on the data at a first timestamp. The first score predicted by the first machine learning model may indicate a likelihood that the transaction identified in the step 410 will be successful. For instance, the first score may indicate that the transaction has a 40% or 70% chance of success.

At step 430, when the first score satisfies a first threshold indicating a potential failure of the future recurring transaction, the transaction server may execute a second model to predict whether a pre-authorization hold would increase the likelihood of success for the future transaction, the second machine learning model further determining a dynamic hold amount for the pre-authorization based on actions of an account associated with the user identifier.

If the first score predicted in the step 420 indicates that the transaction is likely to fail (e.g., the score is lower than a threshold, such as 50% likelihood of success), the transaction server may execute a second machine learning model. The second machine learning model may determine whether pre-authorizing the transaction using a hold amount would increase the likelihood of success for the transaction. The second machine learning model may also determine a date for the pre-authorization. The second machine learning model may also determine the hold amount.

At step 440, the transaction server may conduct the pre-authorization for the future recurring transaction using the data at a second timestamp earlier than the first timestamp and using the dynamic hold amount. The transaction server may put a hold on the user account at a time predicted by the second machine learning model using a hold amount that is also predicted by the second machine learning model.

As discussed herein, the transaction server may monitor the pre-authorization. At step 450, the transaction server may determine whether the pre-authorization succeeded, similar to the step 270 in FIG. 2. If the pre-authorization succeeds, the transaction server may proceed to the step 470. If the pre-authorization is not successful, the transaction may proceeds to the step 460, similar to the step 280. In the step

460, the transaction server may transmit a message to the user inquiring about an alternative payment method (e.g., a new credit card number).

Figure 5:
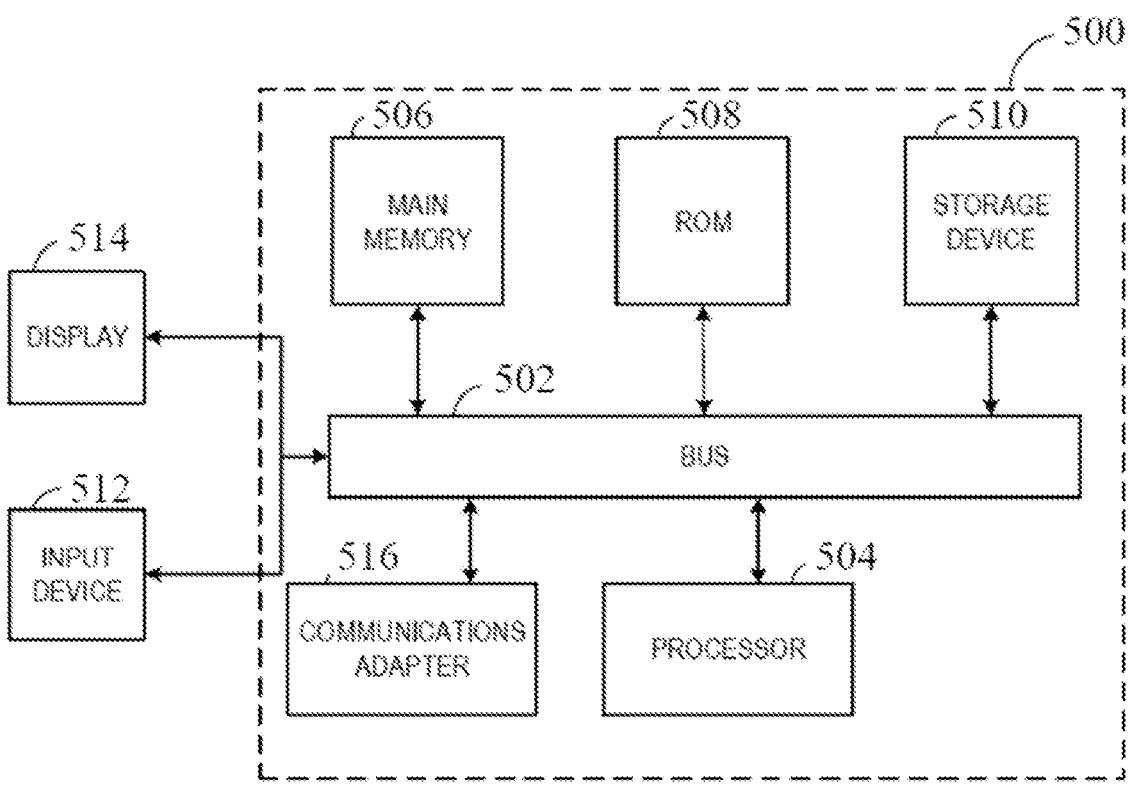
FIG. 5 illustrates a component diagram of a computing system suitable for use in the various implementations described herein, according to an embodiment.

FIG. 5 is a component diagram of an example computing system suitable for use in the various implementations described herein, according to an example implementation. One or more steps of the methods and processes discussed herein can be performed by the computing system depicted in FIG. 5.

The computing system 500 includes a bus 502 or other communication component for communicating information and a processor 504 coupled to the bus 502 for processing information. The computing system 500 also includes main memory 506, such as a RAM or other dynamic storage device, coupled to the bus 502 for storing information, and instructions to be executed by the processor 504. Main memory 506 can also be used for storing position information, temporary variables, or other intermediate information during execution of instructions by the processor 504. The computing system 500 may further include a ROM 508 or other static storage device coupled to the bus 502 for storing static information and instructions for the processor 504. A storage device 55, such as a solid-state device, magnetic disk, or optical disk, is coupled to the bus 502 for persistently storing information and instructions.

The computing system 500 may be coupled via the bus 502 to a display 514, such as a liquid crystal display, or active matrix display, for displaying information to a user. An input device 512, such as a keyboard including alphanumeric and other keys, may be coupled to the bus 502 for communicating information, and command selections to the processor 504. In another implementation, the input device 512 has a touch screen display. The input device 512 can include any type of biometric sensor, or a cursor control, such as a mouse, a trackball, or cursor direction keys, for communicating direction information and command selections to the processor 904 and for controlling cursor movement on the display 514.

In some implementations, the computing system 500 may include a communications adapter 516, such as a networking adapter. Communications adapter 516 may be coupled to bus 502 and may be configured to enable communications with a computing or communications network or other computing systems. In various illustrative implementations, any type of networking configuration may be achieved using communications adapter 516, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 500 in response to the processor 504 executing an implementation of instructions contained in main memory 506. Such instructions can be read into main memory 506 from another computer-readable medium, such as the storage device 510. Execution of the implementation of instructions contained in main memory 506 causes the computing system 500 to perform the illustrative processes described herein. One or more processors in a multi-processing implementation may also be employed to execute the instructions contained in the main memory 506. In alternative implementations, hard-wired circuitry may be used in place of or in combination with software instructions to implement illustrative implementations. Thus, implementations are not limited to any specific combination of hardware circuitry and software.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method for conserving computational resource expenditure associated with conducting failure-prone network operations, the method comprising:

receiving, by a first server, data associated with a future recurring network operation, the data comprising a user identifier, an amount associated with the future recurring network operation, and an account identifier;

executing, by the first server, a machine learning model to predict a first score corresponding to a likelihood of success for the future recurring network operation based on the data at a first timestamp;

when the first score satisfies a first threshold indicating a potential failure of the future recurring network operation, executing, by the first server, a second machine learning model to predict a second score indicating whether a pre-authorization would increase the likelihood of success for the future recurring network operation, the second machine learning model further determining a dynamic pre-authorization amount for the pre-authorization based on actions of an account associated with the user identifier in lieu of a static pre-authorization amount for all user accounts;

when the second score satisfies a second threshold, instructing, by the first server, a second server to conduct the pre-authorization for the future recurring network operation using the data at a second timestamp earlier than the first timestamp and using the dynamic pre-authorization amount, wherein the instructing, by the first server, comprises transmitting instructions generated by the first server to the second server to conduct the pre-authorization using the dynamic pre-authorization amount;

in response to a determination that the pre-authorization is unsuccessful: generating, by the first server, an electronic message to a messaging account associated with the user identifier;

monitoring, by the first server, an interaction with the electronic message; and recalibrating, by the first server, the second machine learning model using the interaction.

2. The method of claim 1, comprising:

identifying, by the first server, one or more second actions of the account between the second timestamp and the first timestamp;

determining, by the first server, the dynamic pre-authorization amount for the pre-authorization based on the one or more second actions of the account; and updating, by the first server, the pre-authorization based on the determined dynamic pre-authorization amount.

3. The method of claim 1, wherein the second machine learning model is trained using a training dataset comprising a set of historic pre-authorized network operations and a resulting dataset of an outcome from whether the set of historic pre-authorized network operations increased a likelihood of success for a set of corresponding network operations.

4. The method of claim 1, wherein the data associated with the future recurring network operation comprises at least one of location data or a time of day.

5. The method of claim 1, further comprising:

responsive to the determination that the pre-authorization is unsuccessful, instructing, by the first server, the second server to conduct the pre-authorization for the future recurring network operation at a third timestamp.

6. The method of claim 1, wherein the electronic message comprises a request for a second account identifier.

7. A non-transitory machine-readable storage medium having computer-executable instructions stored thereon that, when executed by one or more processors, cause the one or more processors to perform operations comprising:

receiving, at a first server, data associated with a future recurring network operation, the data comprising a user identifier, an amount associated with the future recurring network operation, and an account identifier;

executing, by the first server, a machine learning model to predict a first score corresponding to a likelihood of success for the future recurring network operation based on the data at a first timestamp;

when the first score satisfies a first threshold indicating a potential failure of the future recurring network operation, executing, by the first server, a second machine learning model to predict a second score indicating whether a pre-authorization would increase the likelihood of success for the future recurring network operation, the second machine learning model further determining a dynamic pre-authorization amount for the pre-authorization based on actions of an account associated with the user identifier;

when the second score satisfies a second threshold, instructing, by the first server, a second server to conduct the pre-authorization for the future recurring network operation using the data at a second timestamp earlier than the first timestamp and using the dynamic pre-authorization amount, wherein the instructing, by the first server, comprises transmitting first instructions to the second server to conduct the pre-authorization using the dynamic pre-authorization amount;

in response to a determination that the pre-authorization is unsuccessful: generating, by the first server, an electronic message to a messaging account associated with the user identifier;

monitoring, by the first server, an interaction with the electronic message; and recalibrating, by the first server, the second machine learning model using the interaction.

8. The non-transitory machine-readable storage medium of The non-transitory machine-readable storage medium of wherein the instructions further cause the one or more processors to:

identify, by the first server, one or more second actions of the account between the second timestamp and the first timestamp;

determine, by the first server, the dynamic pre-authorization amount for the pre-authorization based on the one or more second actions of the account; and update, by the first server, the pre-authorization based on the determined dynamic pre-authorization amount.

9. The non-transitory machine-readable storage medium of claim 7, wherein the second machine learning model is trained using a training dataset comprising a set of historic pre-authorized network operations and a resulting dataset of an outcome from whether the set of historic pre-authorized network operations increased a likelihood of success for a set of corresponding network operations.

10. The non-transitory machine-readable storage medium of claim 7, wherein the data associated with the future recurring network operation comprises at least one of location data or a time of day.

11. The non-transitory machine-readable storage medium of claim 7, wherein the instructions further cause the one or more processors to:

responsive to the determination that the pre-authorization is unsuccessful, instructing, by the first server, the second server to conduct the pre-authorization for the future recurring network operation at a third timestamp.

12. The non-transitory machine-readable storage medium of claim 7, wherein the electronic message comprises a request for a second account identifier.

13. A system comprising a processor configured to:

receive, by a first server, data associated with a future recurring network operation, the data comprising a user identifier, an amount associated with the future recurring network operation, and an account identifier;

execute, by the first server, a machine learning model to predict a first score corresponding to a likelihood of success for the future recurring network operation based on the data at a first timestamp;

when the first score satisfies a first threshold indicating a potential failure of the future recurring network operation, execute, by the first server, a second machine learning model to predict a second score indicating whether a pre-authorization would increase the likelihood of success for the future recurring network operation, the second machine learning model further determining a dynamic pre-authorization amount for the pre-authorization based on actions of an account associated with the user identifier in lieu of a static pre-authorization amount for all user accounts;

when the second score satisfies a second threshold corresponding to the pre-authorization increasing the likelihood of success for the future recurring network operation, instruct, by the first server, a second server to conduct the pre-authorization for the future recurring network operation using the data at a second timestamp earlier than the first timestamp and using the dynamic pre-authorization amount, wherein the instructing, by the first server, comprises transmitting instructions to the second server to conduct the pre-authorization using the dynamic pre-authorization amount;

in response to a determination that the pre-authorization is unsuccessful: generate, by the first server, an electronic message to a messaging account associated with the user identifier;

monitoring, by the first server, an interaction with the electronic message; and recalibrate, by the first server, the second machine learning model using the interaction.

14. The system of claim 13, wherein the processor is further configured to:

identify, by the first server, one or more second actions of the account between the second timestamp and the first timestamp;

determine, by the first server, the dynamic pre-authorization amount for the pre-authorization based on the one or more second actions of the account; and update, by the first server, the pre-authorization based on the determined dynamic pre-authorization.

15. The system of claim 13, wherein the second machine learning model is trained using a training dataset comprising a set of historic pre-authorized network operations and a resulting dataset of an outcome from whether the set of historic pre-authorized network operations increased a likelihood of success for a set of corresponding network operations.

16. The system of claim 13, wherein the data associated with the future recurring network operation comprises at least one of location data or a time of day.

17. The system of claim 13, wherein the processor is further configured to:

responsive to the pre-authorization failing, conduct the pre-authorization for the future recurring network operation at a third timestamp.

* * * * *